United States Patent [19]

Ramadan et al.

[11] Patent Number: 5,275,862
[45] Date of Patent: Jan. 4, 1994

[54] MULTI-PLY PANEL BOARD WITH SHAPED EDGE

[75] Inventors: Farouk M. Ramadan, Wyoming, Mich.; Francois H. Cauvin, Vanves, France

[73] Assignee: Axis, Inc., Grand Rapids, Mich.

[21] Appl. No.: 868,512

[22] Filed: Apr. 15, 1992

Related U.S. Application Data

[63] Continuation of Ser. No. 655,126, Feb. 14, 1991, abandoned.

[51] Int. Cl.$^5$ .................. B32B 5/12; B32B 23/02
[52] U.S. Cl. ..................... 428/113; 428/192;
428/326; 428/327; 428/479.6; 428/537.1;
428/541; 428/542.6
[58] Field of Search .............. 428/105, 113, 192, 326,
428/327, 479.6, 537.1, 541, 542.6, 913.3

[56] References Cited

U.S. PATENT DOCUMENTS

| | | | |
|---|---|---|---|
| 2,456,005 | 12/1948 | MacKinnon et al. | 154/132 |
| 2,656,296 | 10/1953 | Grangaard | 154/132 |
| 3,414,461 | 12/1968 | Brown et al. | 161/151 |
| 3,441,959 | 4/1969 | Sears et al. | 161/161 |
| 3,560,324 | 2/1971 | Quackenbush | 161/162 |
| 3,563,844 | 2/1971 | Brown | 161/158 |
| 3,583,337 | 6/1971 | Yokeley | 428/192 |
| 3,869,326 | 3/1975 | Matzke | 428/505 |
| 4,007,312 | 2/1977 | Stofko et al. | 428/420 |
| 4,061,823 | 12/1977 | McCaskey, Jr. et al. | 428/318 |
| 4,071,651 | 1/1978 | Hicklin et al. | 428/284 |
| 4,083,743 | 4/1978 | Degens | 156/278 |
| 4,086,125 | 4/1978 | Vasishth et al. | 156/62.2 |
| 4,183,997 | 1/1980 | Stofko | 428/326 |
| 4,199,635 | 4/1980 | Parker | 428/95 |
| 4,246,310 | 1/1981 | Hunt et al. | 428/106 |
| 4,361,612 | 11/1982 | Shaner et al. | 428/106 |
| 4,364,984 | 12/1982 | Wentworth | 428/106 |
| 4,382,108 | 5/1983 | Carroll et al. | 428/326 |
| 4,471,012 | 9/1984 | Maxwell | 428/106 |
| 4,503,115 | 3/1985 | Hemels et al. | 428/281 |
| 4,543,284 | 9/1985 | Baum | 428/106 |
| 4,552,792 | 11/1985 | Julian et al. | 428/40 |
| 4,569,873 | 2/1986 | Robbins | 428/106 |
| 4,615,936 | 10/1986 | Baum | 428/285 |
| 4,620,892 | 11/1986 | Dodson et al. | 156/319 |
| 4,637,954 | 1/1987 | Ohsumi | 428/342 |
| 4,689,257 | 8/1987 | Baum | 428/106 |
| 4,743,509 | 5/1988 | Kokrhanek | 428/425.1 |
| 4,839,555 | 6/1989 | O'Mahoney | 313/493 |
| 4,865,912 | 9/1989 | Mitsumata | 428/285 |
| 4,952,462 | 8/1990 | Bright | 428/212 |
| 4,954,382 | 9/1990 | Riefler et al. | 428/116 |

Primary Examiner—George F. Lesmes
Assistant Examiner—Terrel Morris
Attorney, Agent, or Firm—Hugh Adam Kirk

[57] ABSTRACT

The disclosure concerns a hard multi-ply laminate, at least two of the plies comprising primarily wood fibers compressed with a plastic, and an intermediate ply of a different chemical composition than the wood fiber plies, and top and bottom plies of substantially the same physical performances to avoid warping. An adhesive is applied between each of the plies and all the plies are compressed to form a hard laminate. An edge of the resulting board is shaped to form an artistic configuration, and the edges are coated with a moisture barrier. Thus the resulting hard laminate boards with a sculpted edge can be used directly for table and desk tops, shelving and the like without the addition of an edging strip.

24 Claims, 1 Drawing Sheet

MULTI-PLY PANEL BOARD WITH SHAPED EDGE

This is a continuation of copending application Ser. No. 07/655,126 filed on Feb. 14, 1991 now abandoned.

BACKGROUND OF THE INVENTION

Multi-ply resin-impregnated boards of wood fibers with intermediate layers of plastic, cloth, and glass fibers are all well known individually and in subcombinations in the prior art. However, such boards for decorative purposes previously required separate edging strips and contained comparatively expensive plies of wood fibers impregnated with plastic and compressed under high pressure.

SUMMARY OF THE INVENTION

The durable and decorative multi-ply panel board of this invention comprises at least three and preferably more separate layers of sheet material, adhesively joined together. At least two of the layers comprise wood fibers and/or sawdust adhered together with a plastic material, and at least one intermediate layer of a material having a different composition than the wood fiber layers, namely a cloth, glass fibers, a plastic film, or a transparent sheet. These layers also may be of one or more different colors. The top and bottom or two outer layers of this laminate board or panel have substantially the same physical properties, that is a similar modulus of elasticity to prevent warping of the above mentioned layers. The top layer may be of any suitable or desirable sheet material, such as leather, fabric, veneer, high-pressure laminate sheet, or the like. Once the layers are assembled with an adhesive between them, the panel is compressed until the adhesive sets. Then at least one edge of the panel is sculptured artistically into a form which preferably shows the different layers of its composition, producing a striped colorful pattern. In fact, one of the intermediate transparent layers may be provided with a light source for producing an illuminated strip around the other edges of the whole panel.

Since the materials of many of the layers of this panel are susceptible to the absorption of moisture, particularly the layers containing wood fibers, preferably the whole panel is coated with a moisture barrier, such as a wood stain, transparent varnish, or if desired, even a colored varnish. This moisture barrier is applied after the panel has been cut to its final size and particularly to the shaped and cut edges thereof.

OBJECTS AND ADVANTAGES

It is an object of this invention to produce an efficient, economic, simple and effective, durable multi-ply panel board that does not require additional edging when used for table and desk tops, shelves, and the like.

Another object is to produce such a board that does not warp, resists dents, and may be tinted and may be used for doors and wall panels.

A further object is to provide such a board that has a decorative striped edge which may have any desired configuration and may even be interiorally illuminated.

A still further object is to produce such a laminate board which may be simultaneously shaped and edged and refinished or reformed with a single tool, such as a router.

BRIEF DESCRIPTION OF THE VIEWS

The above mentioned and other features, objects and advantages, and a manner of attaining them are described more specifically below in reference to embodiments of this invention shown in the accompanying drawings, wherein:

FIGS. 1 and 2 disclose a section and plan view of an edge portion of a multi-layer board with a round edge and veneer top surface according to an embodiment of this invention;

FIGS. 3 and 4 disclose a section and plan view of an edge portion of a multi-layer board with a different shaped bevelled edge and a high-pressure laminate sheet top surface according to another embodiment of this invention;

FIG. 5 discloses another embodiment of a plurality of identical wood layers with an intermediate transparent plastic layer being illuminated such as by a light source.

DETAILED DESCRIPTION OF PREFERRED EMBODIMENTS

More specifically, the basic two or more plies, sheets, or layers of the laminated board of this invention are composed of wood and/or sawdust fibers with a phenolic resin binder and formed under pressure. These basic sheets may be either light or dark in color or may have coloring added to them. The darker-colored sheets, for example, may be purchased under the trademark of "DURON", and the lighter-colored sheets may be purchased under the trademark "SUPERWOOD". The light-colored sheets contain more cellulose fibers or wood chips, for example 95%, and only 5% of sawdust, while the darker-colored sheets contain more sawdust and less of the wood chips or fibers. These sheets, when formed in the panel or board of this invention, are about one-eighth inch ($\frac{1}{8}$") in thickness, and the final panel board thickness may range between about one-half inch ($\frac{1}{2}$") and about one and one-quarter inch ($1\frac{1}{4}$"), and may be formed into boards five feet (5') by eight feet (8') in size, or more, such as twelve feet (12') or sixteen feet (16') along a side.

Preferably between or intermediate at least a pair of the above mentioned wood or cellulose fiber sheets or layers there is provided any one or more layers selected from the group of materials composed of cloth, glass fibers, plastics, including polyurethane, high-pressure laminates, and transparent sheets such as sold under the trademark "LUCITE". The sculptured edging then shows these intermediate layers as decorative stripes on the edge of the table, desk or shelf upon which the panel of this invention is employed.

The top layer may be of veneer or high-pressure laminate, such as sold under the trademark "FORMICA", and may contain different colors and/or patterns as desired. It is important that the top and bottom layers have similar physical properties, namely of elasticity, so as to prevent warping of the board. Thus both the top and bottom layer may be the same.

Between each of all of these different layers there is provided an adhesive to hold the layers together which may be of a casein, urea or other type of plastic adhesive. Once the adhesive is placed between each of the layers and the layers are placed into a press, they are compressed until the adhesive is set to form a durable board.

The edges and sides of the board are then cut to the shape desired and a barrier coat is applied to at least the edges and preferably to the entire board so as to avoid the absorption of moisture into the wood fibers in the original basic layers of this panel board.

Although the average thickness of the basic wood fiber-containing layers is usually about one-eighth inch (⅛"), the intermediate, top and bottom and other layers may be the same, thinner, or thicker, as desired.

Figure 1:
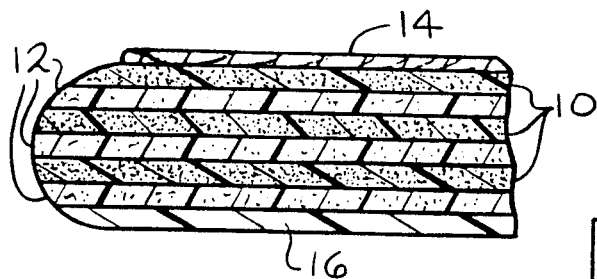
Figure 2:
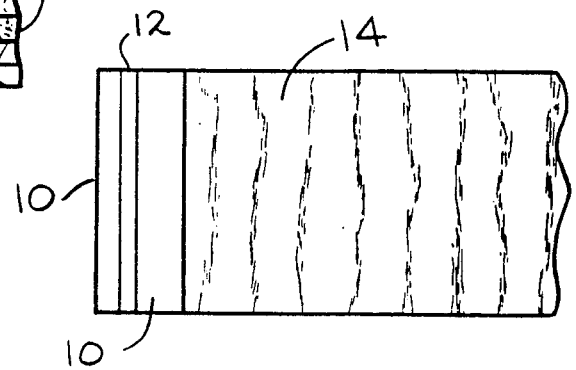

Referring now to some specific examples of boards according to this invention, FIGS. 1 and 2 show an eight-layer panel in which the darker sheets or layers 10 are composed of the finer cellulose wood fibers such as sawdust impregnated with a phenolic resin, while the lighter-colored sheets or layers 12 alternating therewith contain a major percentage of wood chips or longer fibers held together with a phenolic resin. The top layer 14 in FIGS. 1 and 2 are shown to comprise a wood veneer while the bottom layer 16 in FIG. 1 comprises a dark high-pressure laminate such as "FORMICA".

Figure 3:
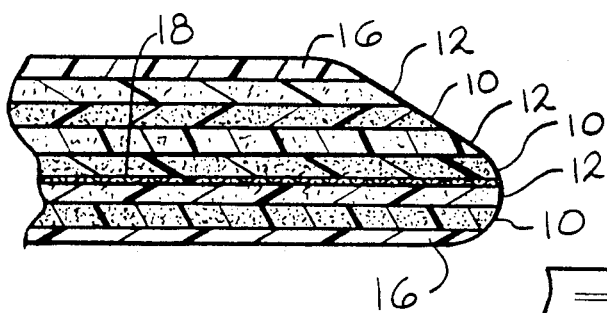
Figure 4:
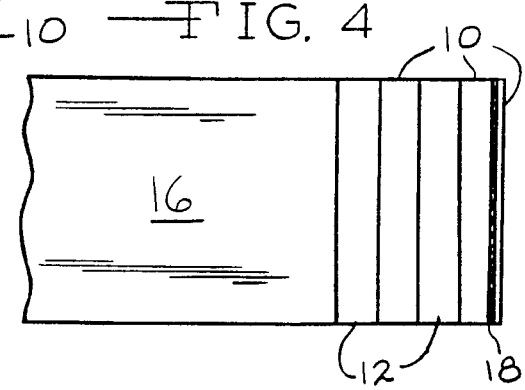

Referring now to FIGS. 3 and 4, both the top and bottom layers comprise a dark high-pressure laminate or "FORMICA" 16; however, the edge is bevelled as shown in FIG. 3 to show more alternate light 12 and dark 10 layers and an intermediate cloth layer 18 which gives a different design to the strip along the bevelled edge.

Figure 5:
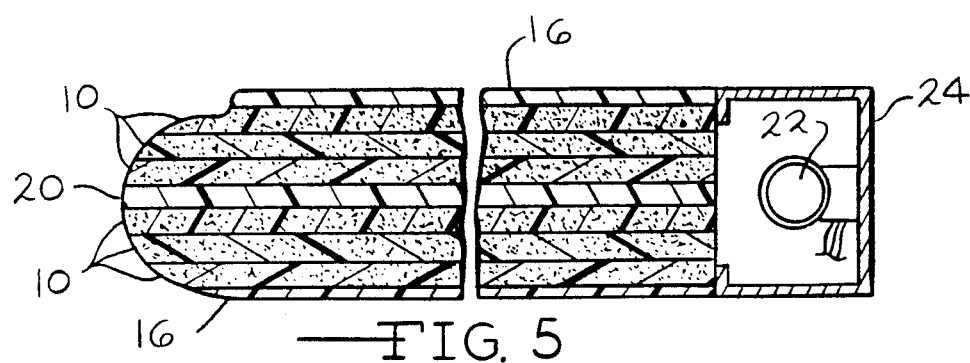

Referring to FIG. 5 there is shown a transparent plastic layer 20 intermediate three dark-colored wood fiber layers 10. A light source 22, such as a tubular fluorescent bulb in a housing 24 is located along one edge of the board so that the light source illuminates the whole layer 20 and its edges along the edges of the board for further giving the board an attractive decorative appearance.

Thus, in view of the specific examples shown in the FIGS. 1 through 5, it is to be readily understood that many different combinations of layers can be employed in producing the decorative panel board and its decorative edges from relatively inexpensive resin-bound wood fiber base sheets without departing from the scope of this invention.

While there is described above the principles of this invention in connection with specific items and products, it is to be clearly understood that this description is made only by way of example and not as a limitation to the scope of this invention.

What is claimed is:

1. A flat sheet multi-ply panel board having parallel layers comprising:
    A) at least two layers of compressed wood fiber plastic board, each layer having fibers selected from the group consisting of wood chips, sawdust and cellulosic wood fibers,
    B) at least one layer intermediate said two wood fiber plastic board layers, said intermediate layer being selected from the group consisting of cloth, glass fibers, and plastics,
    C) a top and bottom layer selected from the group consisting of leather, fabric, veneer and high-pressure laminate of substantially similar physical properties to prevent warping,
    D) an adhesive between each of said layers,
    E) a shaped edge on said panel board, and
    F) a moisture barrier coating on at least the edges of said panel board.

2. A board according to claim 1 containing between five and nine of said layers.

3. A board according to claim 1 wherein said intermediate layer comprises a transparent plastic.

4. A board according to claim 3 including a light source along an edge of said board for illuminating said transparent plastic layer.

5. A board according to claim 1 wherein said intermediate layer comprises reinforcing fibers.

6. A board according to claim 1 wherein said top layer comprises a veneer.

7. A board according to claim 1 wherein said top layer comprises a high-pressure laminate.

8. A board according to claim 1 wherein said bottom layer comprises a high-pressure laminate.

9. A board according to claim 1 wherein said adhesive comprises a urea resin.

10. A board according to claim 1 wherein said adhesive comprises a casein resin.

11. A board according to claim 1 wherein said moisture barrier comprises a transparent coating.

12. A board according to claim 1 wherein at least one of said layers includes a coloring material.

13. A board according to claim 1 wherein said top and bottom layers have similar moduli of elasticity.

14. A flat sheet multi-ply panel board comprising successively:
    a) a top layer of a high-pressure laminate,
    b) a pair of different compressed wood fiber plastic board layers, one of fine fibers and the other of longer fibers,
    c) at least one central layer selected from the group consisting of cloth, glass fibers, and plastics
    d) a second pair of different compressed wood fiber layers similar to the above said pair of different compressed wood fiber layers,
    e) a bottom layer of a high-pressure laminate of substantially similar physical properties as said top layer to avoid warping of said board,
    f) an adhesive between each of said layers,
    g) a shaped edge on said panel board, and
    h) a moisture-proof barrier coating on at least the edges of said panel board.

15. A board according to claim 14 wherein said fine fiber layer of said pair of layers are from sawdust.

16. A board according to claim 14 wherein said longer fiber layer of said pair of layers are from wood chips.

17. A board according to claim 14 wherein said to central layer is transparent.

18. A board according to claim 17 including a light source along one edge of said board for illuminating said transparent plastic layer.

19. A board according to claim 14 wherein said top layer comprises a veneer.

20. A board according to claim 14 wherein said adhesive comprises urea resin.

21. A board according to claim 14 wherein said adhesive comprises a casein resin.

22. A board according to claim 14 wherein said moisture barrier comprises a transparent coating.

23. A board according to claim 14 wherein at least one of said layers includes a coloring material.

24. A board according to claim 14 wherein the top and bottom layers have similar moduli of elasticity.

* * * * *